Nov. 22, 1938.                    C. H. PHELPS                    2,137,949
           STEERING WHEEL SUPPORTING DEVICE FOR TESTING APPARATUS
                         Filed Jan. 6, 1933        5 Sheets-Sheet 1
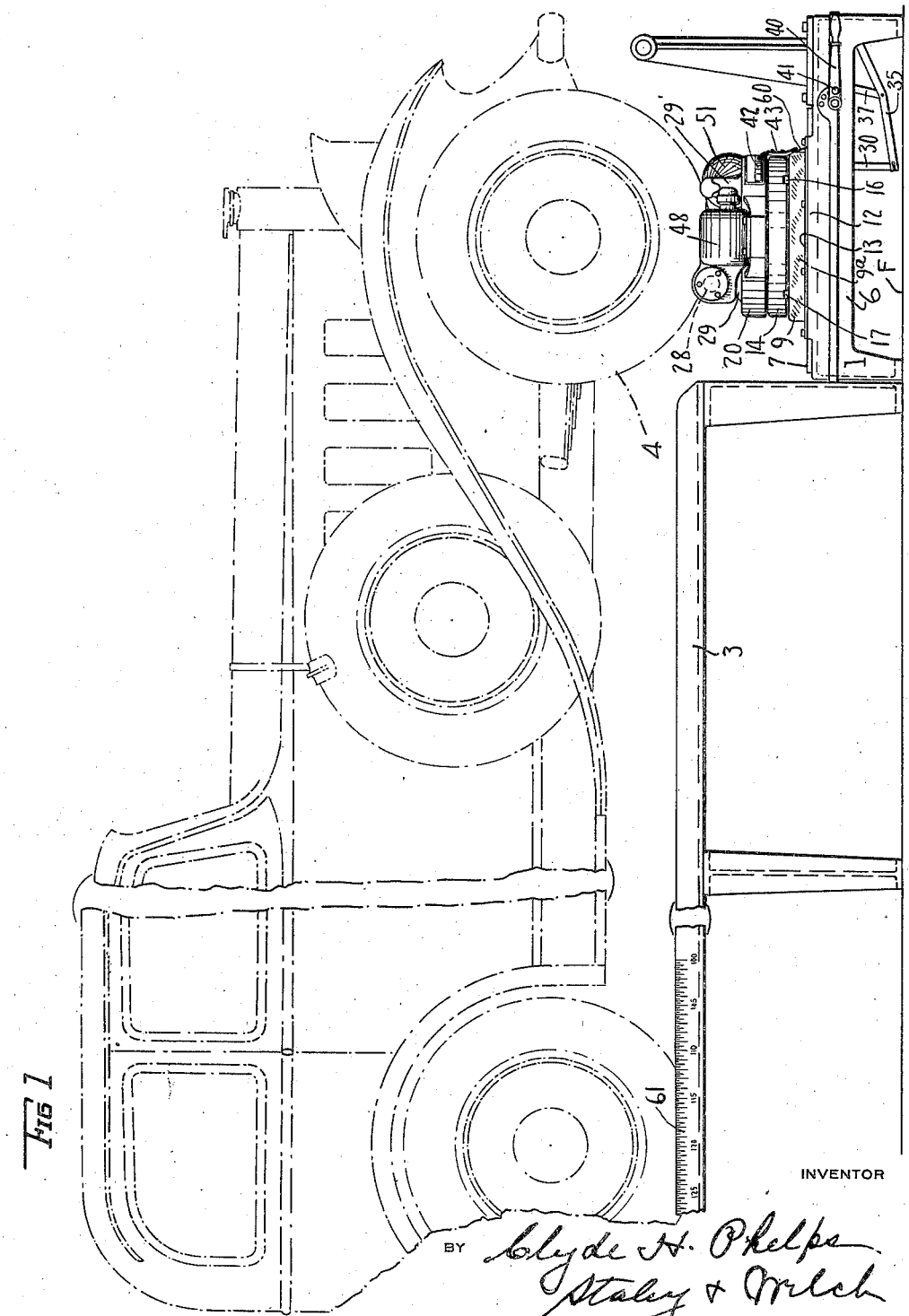
INVENTOR
BY Clyde H. Phelps
Staley & Welch
ATTORNEYS Nov. 22, 1938.  C. H. PHELPS  2,137,949
STEERING WHEEL SUPPORTING DEVICE FOR TESTING APPARATUS
Filed Jan. 6, 1933   5 Sheets-Sheet 2
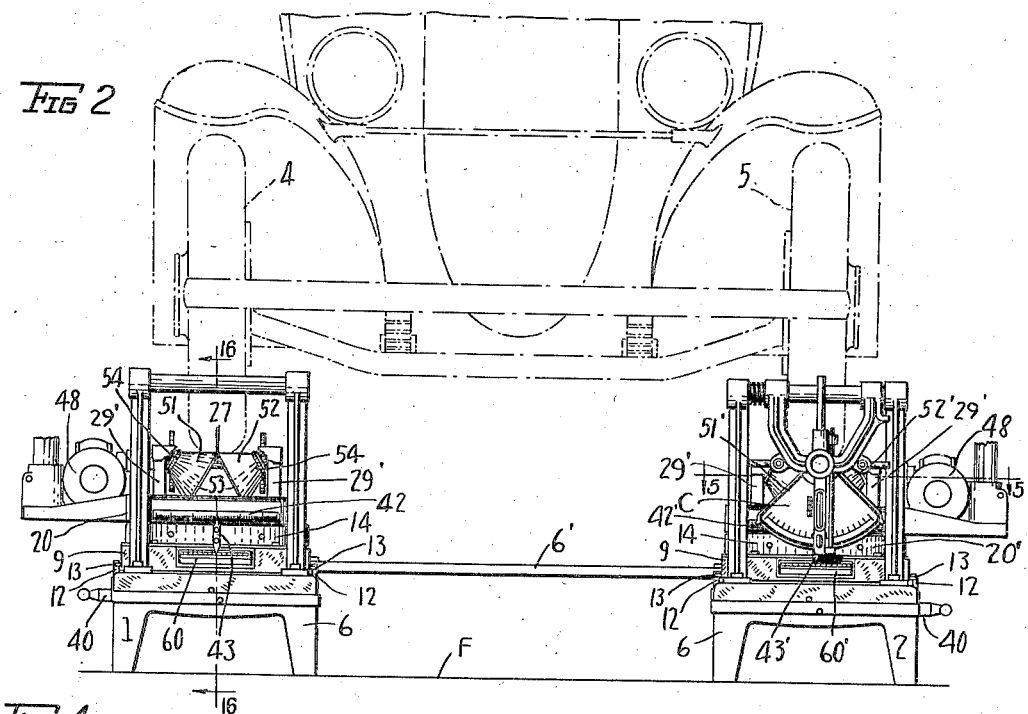
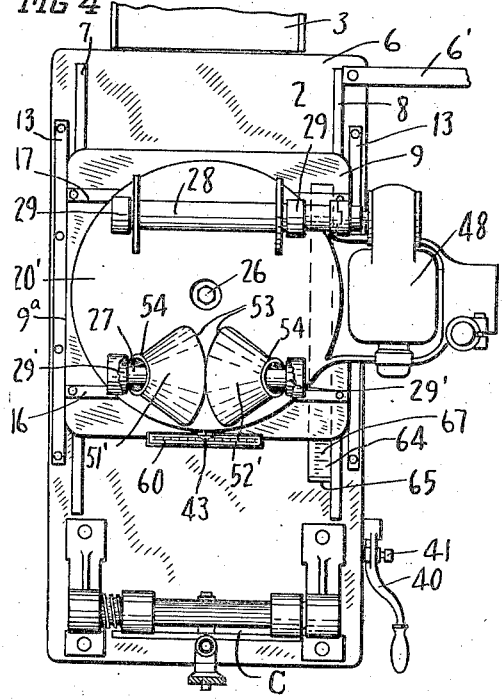
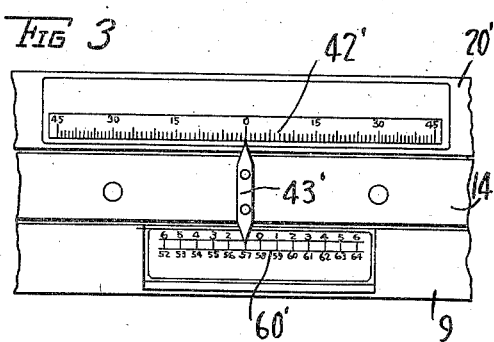
INVENTOR
Clyde H. Phelps
BY
Staley & Welch
ATTORNEYS Nov. 22, 1938.    C. H. PHELPS    2,137,949
STEERING WHEEL SUPPORTING DEVICE FOR TESTING APPARATUS
Filed Jan. 6, 1933    5 Sheets-Sheet 3
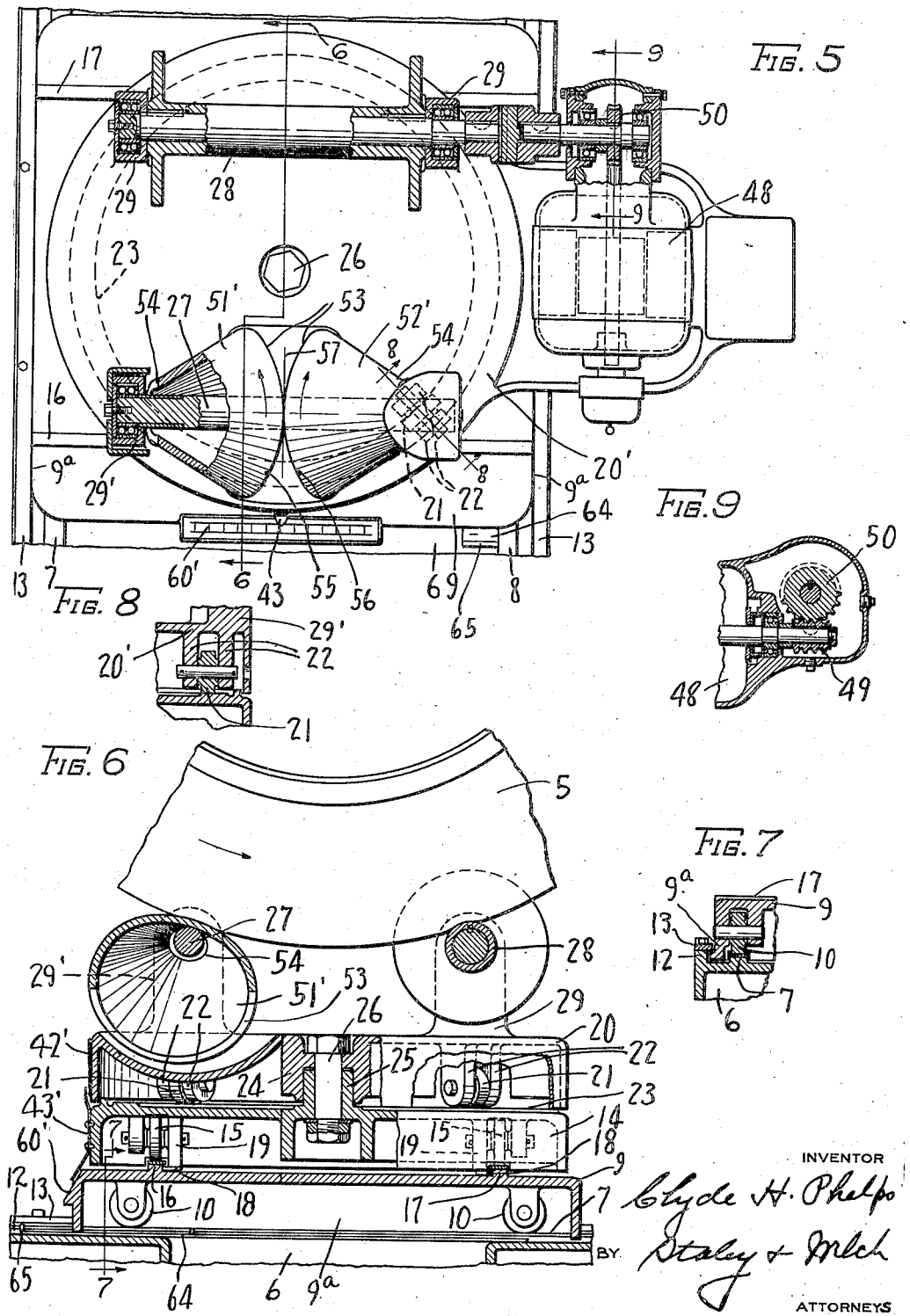

Nov. 22, 1938.                C. H. PHELPS                 2,137,949
           STEERING WHEEL SUPPORTING DEVICE FOR TESTING APPARATUS
                    Filed Jan. 6, 1933           5 Sheets-Sheet 4
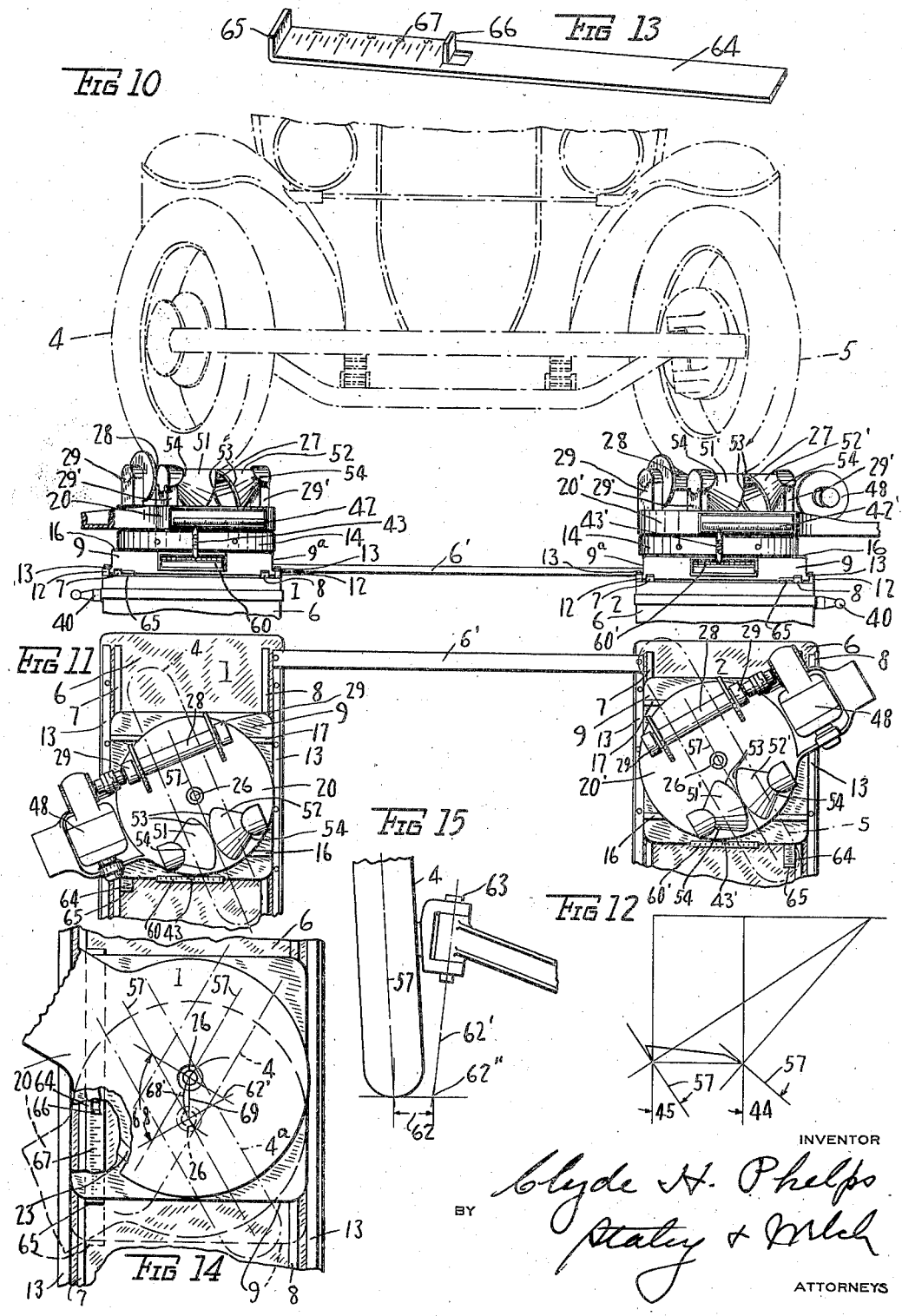
INVENTOR
Clyde H. Phelps
BY
Staley & [illegible]
ATTORNEYS

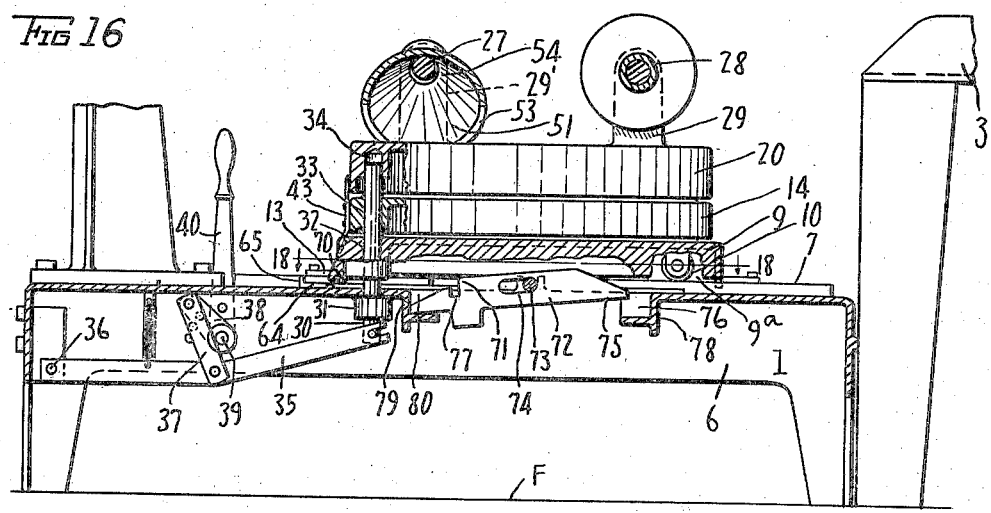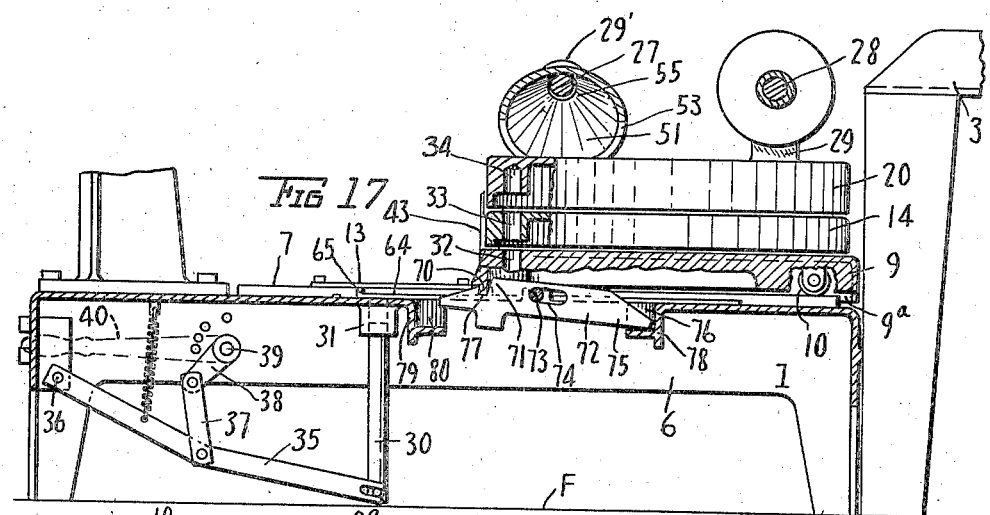

Patented Nov. 22, 1938

2,137,949

UNITED STATES PATENT OFFICE 2,137,949

STEERING WHEEL SUPPORTING DEVICE FOR TESTING APPARATUS

Clyde H. Phelps, Mount Vernon, N. Y., assignor, by mesne assignments, to The Master Electric Company, Dayton, Ohio, a corporation of Ohio Application January 6, 1933, Serial No. 650,435

10 Claims. (Cl. 33—203)

This invention relates to devices for facilitating the testing of steering wheels of automobiles and their steering connections, it more particularly relating to devices upon which the wheels may be mounted so that the wheels may be rotated and readily turned to any desired angle.

One of the objects of the invention is to provide a device of this character which embodies a rotatable support which is both longitudinally and laterally movable with relation to the vehicle to enable it to accommodate itself to all the different desired positions of a wheel mounted thereon.

Another object of the invention is to provide means for locking the wheel support against rotary, longitudinal and lateral movement when initially positioning the wheel thereon; a further and more specific object being to lock the longitudinally movable member of the support only leaving the rotatable support free to rotate and move laterally.

Another object of the invention is to provide means for automatically locking the longitudinally movable member of the support against movement in a forward direction when the vehicle wheel is being removed therefrom.

Another object of the invention is to provide supports for the vehicle wheel which will readily indicate the width of the tread of the vehicle and will also indicate the degrees to which the wheels have been turned.

Another object of the invention is to provide for determining the pivot dimensions of either end of the steering connections and axle.

Another object of the invention is to provide for indicating the wheel base of the vehicle.

Other objects of the invention will appear from the accompanying description.

In the accompanying drawings:

Fig. 1 is a side elevation of one of the improved devices shown as supporting the right front wheel of a motor vehicle, the vehicle being shown conventionally in broken lines.

Fig. 2 is a front elevation of the right and left hand units of the device shown supporting the front wheels of a motor vehicle, the vehicle being shown conventionally in broken lines.

Fig. 3 is an enlarged front elevation of a portion of one of the wheel-supporting units to more clearly show a pointer and a protractor scale divided into degrees and fractions thereof, and a second scale divided into inches and fractions thereof.

Fig. 4 is a top plan view of the left hand wheel-supporting unit.

Fig. 5 is an enlarged view of a portion of Fig. 4, with a part of the mechanism shown in horizontal section, the portion in section being taken on the line 5—5 of Fig. 2.

Fig. 6 is a fragmentary longitudinal section on the line 6—6 of Fig. 5.

Fig. 7 is a fragmentary transverse section on the line 7—7 of Fig. 6.

Fig. 8 is a fragmentary section on the line 8—8 of Fig. 5.

Fig. 9 is a fragmentary longitudinal section on the line 9—9 of Fig. 5.

Fig. 10 is a fragmentary front elevation of the improved devices showing conventionally a motor vehicle supported on the devices with the steering wheels of the vehicle turned as in steering. The view shows the difference in the angular relation of the steering wheels.

Fig. 11 is a fragmentary top plan view of the devices in the position they are caused to assume when the steering wheels are turned as shown in Fig. 10.

Fig. 12 is a diagrammatic view showing the difference in the angular relation of the steering wheels and also how the correct angular relation of one of the steering wheels when compared to a given setting of the other steering wheel is determined.

Fig. 13 is a perspective view of the gauge employed in determining the pivot radius.

Fig. 14 is a top plan view partly broken away of one of the wheel-supporting units showing the application and manner of operation of the pivot radius gauge.

Fig. 15 is a front elevation of a portion of the axle and one of the steering wheels of a motor vehicle to define pivot radius.

Fig. 16 is an enlarged longitudinal section partly in elevation, the sectional portion being taken on the line 16—16 of Fig. 2, and shows a locked position of the component parts of a device.

Fig. 17 is a view similar to Fig. 16, showing an unlocked condition of the parts and also showing the parts in a different working position.

Fig. 18 is a fragmentary horizontal section on the line 18—18 of Fig. 16.

Fig. 19 is a fragmentary longitudinal section on the line 19—19 of Fig. 18, but with a latch member in a different working position.

In view of the possible influence of the effects of camber, caster and king-pin tilt, upon certain tests, and to provide that the accuracy of any particular test is not impaired by the effects of any other factors, the wheel-supporting devices are each composed of a unit consisting of a plurality of superimposed, movable elements. The lowermost member is mounted on a stationary base so as to be longitudinally movable thereon. On this lowermost longitudinally movable member is mounted an intermediate member capable of lateral movement, while on the intermediate member is pivotally mounted the uppermost member capable of rotary movement in a horizontal plane.

A steering wheel rests on the uppermost member of each unitary structure, and in making a test, when the front wheels are turned to the right or left under the influence of the steering gear, the rotatable members are each given a partial rotation in a horizontal plane and those effects just mentioned which might otherwise influence the determinations are compensated by the rotatable, lateral and longitudinal movements of which the several members are capable, and the accuracy of the tests is insured.

The units are set in a prefectly level position, and in certain of the tests mentioned an axle level is employed to insure that the front axle of the car being tested may be brought to a level position by suitable means.

Referring to the drawings, the right and left hand units are represented in general at 1 and 2 respectively. Each of the units is set on the floor F and spaced apart, as seen in Fig. 2, a given distance by means of spacing bars 6' to accommodate automobiles of the average tread, but one of such bars being shown in the present case. In the present case, the center-to-center distance between the rotatable elements in the locked position is fifty-eight inches. A pair of ramps 3 which consists of metallic members of channel section having the flanges turned upwardly to form a guiding track, are utilized to form approaches to the devices. These ramps terminate a short distance at the rear of the units and when moved forwardly off the ramps the front wheels of an automobile easily position themselves on the units, where they are supported in a state of rest, after which the movable elements may be unlocked. Thus the right front wheel 4 of a car being tested rests on the unit 1 and the left front wheel 5 rests on the unit 2.

The units are identical except that right and left hand construction is employed; for this reason the following decription of a single unit is understood to apply to each structure.

The stationary base of each unit is indicated at 6. On its surface is provided a pair of parallel tracks 7 and 8 extending from near the front, to the rear of the base. The lowermost element 9 is movable along the tracks of the base in a longitudinal direction; that is, in alignment with the longitudinal extension of the car.

To reduce the friction to a minimum, the movable element 9 is provided with a plurality of small wheels 10 (Fig. 6 and Fig. 18) suitably arranged so that a pair rest on each track 7 and 8, and the element 9 is guided between longitudinally extending raised portions 12, one portion each being employed on each edge of the upper surface of the base 6. These raised portions 12, one of which is shown in cross-section in Fig. 7, co-act with the downwardly extended vertical sides 9a of the element 9. The element 9 is retained loosely on the base 6 by gibs 13, one being shown in cross-section in Fig. 7.

On the movable element 9 is mounted for lateral motion an intermediate movable element 14 and on the upper surface of this element 14 is pivotally mounted the rotatable element 20 (Fig. 6). The element 14 is also mounted on wheels and tracks, two of the wheels, of which four are used, being indicated at 15 (Fig. 6) and the tracks 16 and 17 being indicated in cross-section in the same figure, the tracks being formed on the upper surface of the longitudinally movable element 9 at right angles to the tracks 7 and 8 on the base 6. This element 14 is also retained properly upon the tracks 16 and 17 by the use of gibs 18 secured to the bottom of bosses 19 (Fig. 6).

The rotatable element 20 is supported upon the upper surface of the laterally movable element 14 by means of four small wheels 21 which are equi-distantly spaced and whose axes are radially disposed with reference to the center of rotation of the rotatable element 20; one wheel 21 is shown in broken lines in Fig. 5, and two are shown in Fig. 6. Each of these small wheels 21 is mounted between pairs of downwardly extending ears 22 projecting from the under surface of the rotatable element. The wheels 21 bear directly on a circular track 23 which is shown by broken lines in Fig. 5 and in partial section in Fig. 6. The pivotal connection of the rotary element 20 with the laterally movable member 14 is by means of a hollow boss 24 extending downwardly from the under surface of the rotatable element 20 and into which is comparatively loosely fitted an upwardly extending hollow boss 25 integrally attached to the upper surface of the laterally movable element 14. The members 14 and 20 are loosely connected by the center bolt 26, as a means to guard against accidental displacement.

The steering wheel is centrally supported on the rotatable element 20 on two parallel horizontally disposed rollers 27 and 28 rotatably mounted in the upper ends of short columns 29 and 29', respectively, equidistantly spaced from the center of rotation of the rotatable element 20, insuring that the axis of the front wheel is directly over the center of rotation of the rotatable element. A pair of hollow conical rollers are also shown supported on the roller 27. These conical rollers will be described later.

In order to maintain each movable element in a fixed position when a steering wheel is placed on the unit, a means for locking these elements with the base is provided. The locking means consists of a shot-bolt 30 which is slidably mounted in a boss 31 in the base 6 and when in locked position as shown in Fig. 16 is projected upwardly, passing through an opening 32 in the longitudinally movable element 9, an opening 33 in the laterally movable element 14 and into an opening 34 in the rotatable element 20. The opening 34 in the last named element is so positioned as to cause the rollers 27 and 28 to assume a position transversely disposed to the direction of travel of the automobile wheel.

Means for manipulating the shot-bolt 30 is provided by the linkage shown in Fig. 16 and Fig. 17. The shot-bolt is supported by the forked free end of a bent lever 35 which is fulcrumed at 36 to the base 6, and means for elevating and lowering the shot-bolt 30 are supplied by pivotally connecting the bent lever 35 to the free end of a crank arm 38 by the link 37. The crank arm 38 is fixed to the inner end of a rock shaft 39 on whose outer end is secured a hand lever 40 having a set-screw 41 inserted through the handle thereof, whereby the elevation of the shot-bolt may be maintained at different levels for the purpose of providing that one or more of the various movable elements may be locked and permitting free movement of the element or elements left in an unlocked state. The mechanism shown in Fig. 17 is in the unlocked position. In this view, however, the movable elements are shown moved to the rear of the base due to circumstances which will be explained later.

The angles through which the rotatable member 20 moves are measured on a protractor scale 42 fixed on the forward vertical side of the member 20, the scale moving by the upper end of a pointer 43 secured to the center of the forward side of the intermediate member 14. The scale 42 is graduated in degrees in an ascending order to the right and left from a zero point at the center.

It was mentioned that the front wheels 4 and 5 were supported on rotatable rollers 27 and 28 (Fig. 11) mounted on the upper surface of the rotary member 20. The roller 28 is power-driven, while the roller 27 supporting the hollow conical rolers is an idle roller. Therefore when the power rollers are rotated, the vehicle wheel is rotated in the direction of the arrow on the wheel in Fig. 6. Means are provided for rotating the vehicle wheels by a small electric motor 48 connected by means of the gearing consisting of a worm 49 and worm-wheel 50 (Fig. 9), to the rear or power roller 28, which revolves at a very slow rate of movement.

In making the tests on an automobile steering gear of which the present invention is capable, it is essential that the rotary member 20 of the right unit 1 and its complementary member 20' of the left unit 2 be each centrally positioned below the steering wheel mounted thereon, not only referring to the position of the steering wheel with reference to its longitudinal central position, which latter positioning is insured by the equidistant spacing of the power roller 28 and the idle roller 27, but laterally as well, referring here to the plane of the wheel with respect to the center of rotation of the rotary member 20. The centering operation is conveniently and automatically accomplished by employing the hollow, conically-shaped rollers 51 and 52 shown interposed between the tire of the steering wheel and the idle roller 27 on the right unit 1, and in like manner at 51' and 52' on the left unit 2 (Figs. 10 and 11).

The lead rollers 51 and 52 are hollow cones of uniform wall thickness and are loosely supported on the roller 27, and due to the position of the center of gravity of the rollers 51 and 52, these rollers hang from the roller 27 (Fig. 6) whereby wheels of various diameters are accommodated. The lead rollers are placed on the roller 27 in such manner that the large ends 53 thereof are adjacent each other, and to absorb the lateral thrust effects which arise from causes which will be explained, the small ends 54 bear against the inner surfaces of the forward pair of columns 29', which are equidistantly spaced from the longitudinal center line 57 of the rotary element 20. The lead rollers are identical and therefore the edges of the large ends 53 lie directly in the longitudinal center line (Fig. 5).

The actual contact of a steering wheel with the power and lead rollers is obviously made by the tire, which is usually a rubber tire of the pneumatic or solid type, and utilization is made of the tendency which exists during rotation of a tire on these rollers wherein a lead roller tends to force the wheel laterally from its surface, in a manner which may be explained as follows:

Referring to Fig. 5 in which the direction of rotation of the lead rollers 51 and 52 is shown by the arrows thereon, it will be seen that the imaginary points 55 and 56 on the edges 53 of the lead rollers will arrive eventually at the longitudinal center line indicated at 57, and in so doing, these points must travel laterally and upwardly as well; in other words, the points 55 and 56, and all other imaginary points on the surfaces of the conical lead rollers, revolve in circles inclined toward the center line 57. Portions of the tire, therefore, in contact with surface of a lead roller have imparted thereto a lateral thrust tending to force the tire toward the large end of the lead roller, which force is opposed by the oppositely positioned lead roller. Thus, in an example where a tire has a larger engagement with one lead roller than with the other, the lateral thrust due to the smaller engaged area is opposed by an engaged area of equal size on the surface of the lead roller supporting the greater portion of the tire, leaving an unopposed thrust resulting from the remaining engaged area on the latter mentioned lead roller. Obviously, this unbalanced thrust tends to force the tire laterally from the lead roller surface toward the large end thereof, but in so doing increases the engaged area on the lead roller which at the outset had received but little of the tire surface. The increase in the engaged surface obviously balances a portion of the lateral thrust and thereby reduces the effect thereof, until eventually the forces are equalized by equal areas of engagement, and the wheel then rotates with its central plane coinciding with the center line 57. The function and use of the lead rollers is more fully discussed in Letters Patent No. 2,016,943, October 8th, 1935. In the present invention, however, since each steering wheel is supported on a unit having members capable of lateral movement, the tendency is to cause the movable portion of the unit to seek the central plane of the wheel rather than that the wheel tends to seek the center of the unit.

Therefore, regardless of the position of the wheels on the units after the car has been driven thereon, the operation of the centering devices results in centering the units, whereby the tread dimensions of a car greater than the center-to-center distance of the units cause the units to be spread apart, or on the other hand to be drawn upwardly. After centering, the tread dimensions of the front wheels may be readily determined by reference to a pair of scales, there being a scale 60 (Figs. 2 and 3) fixed on the forward vertical side of the longitudinal member 9 in which moves the lower end of the index finger 43, and a similar scale 60' fixed on the corresponding member of the left hand unit 2. These scales 60 and 60' are complementary to each other; that is, the scale 60 reads in ascending numerals to the left as viewed from the front (Fig. 2) and the scale 60' ascends in numerals to the right (in the same figure) or as shown in Fig. 3. To determine the tread dimensions after centering the units, add to the smaller reading half the difference between the smaller reading and the larger reading. For example, the right index finger 43 may point to the numeral 59 on the right scale 60 and left index finger 43' may point to the numeral 57 on the scale 60'. The difference is two, which being halved and added to the smaller reading, 57, equals 58, which is the tread dimension of the steering wheels.

One of the other features of the machine is the possibility of determining the wheel-base dimension of the car. The wheel base in inches is read from a scale 61 imprinted on the outer vertical side of the ramp 3. The scale 61 is graduated in inches measured from the center of the rotary member 20 when the member is in the locked position and the wheel-base of the car is read from the scale by sighting downwardly from the center of the rear wheel.

The pivot radii of a steering apparatus should be alike at each side and in the present invention these radii are determined accurately. The pivot radius is explained by reference to the diagrammatic Fig. 15, it being the distance 62 measured on any flat surface on which the wheel is normally supported between the intersection of the center line of the plane of the wheel 4 in this figure with the flat surface and the point of intersection of the produced axis 62' of the king-pin 63 with the flat surface. The radius is measured by the movement of a flat bar 64 having an up-turned end 65 and a tongue 66, between which end and tongue is a scale 67. This bar 64 is slidably supported on the base 6 in a suitable guide-way (not shown) thereon, in the space between the base 6 and the lower portion of the longitudinally movable member 9, and by contact of the forward edge of the member 9 the bar 64 is moved in the forward direction when this member 9 is moved, while upon the reverse or rearward movement the bar 64 remains stationary.

To determine the pivot radius of one end of the steering apparatus connected with the axle, as for example, at the right end, the following preferred method may be employed. The wheel 4 is turned first by the steering gear to a right turn of 30° deviation as read from the protractor scale 42, as shown by the broken line 4 in Fig. 14. The bar 64 is then manually moved rearwardly until this movement is arrested by the contact of the upturned end 65 with the movable member 9. The wheel 4 is then turned by the steering gear to make a left turn of 30° deviation as seen by broken line 4ª (Fig. 14). It should be clear that if pivot radius is present, as is shown in the present example by the distance 62 in Fig. 15, that in making the swing from right to left the wheel 4 would be forced to roll around the point 62" representing the intersection of the king-pin axis produced to the flat surface, the path of the wheel being on an arc of a circle bounded by the included angle 68, as indicated at 68', and when suported on the movable members as shown in the drawings, the members are caused to move, more particularly the member 9, which moves to the broken line position in Fig. 14, carrying the bar 64 with it. The wheel 4 is then returned to the right turn of 30° deviation as mentioned at the start of this test, leaving the bar 64 in the forward position. Due to the fact that the wheel was moved through the arc 68' bounded by the included angle of 60°, as shown at 68 (Fig. 14) the movement of the member 9 and likewise the bar 64 is in the direction of the chord 69 of the angle 68, and since the chord of an angle of 60° is equal to the radius of the circle passing through the ends of the chord, the pivot radius is shown by the distance the scale bar 64 was carried forwardly.

Inasmuch as it may be impossible to lock all the movable elements after the longitudinal centering operation of the rotary members 20 and 20' has been made, due to the fact that the tread dimensions of the car being tested may be greater or less than the center-to-center distance of the units, provision is made to lock the movable elements by other means to prevent damage to the parts when the car is being removed from the units, since if the elements were not locked in some manner at the time when the wheels are leaving the rear rollers 28, there is danger that damage would result due to a forcing ahead of the movable elements.

The locking means automatically functions when the car is being moved off the units. Referring to Figs. 16 and 17, the first portion of the rearward movement of the car draws the movable portions of the units to the rear as shown in Fig. 17 in a longitudinal direction whereby contact of the forward depending flange 70 of the element 9 with the projecting portion 71 of a latch member 72, pivotally supported on a stationary bar 73 carried by the base 6 and inserted through an elongated horizontal opening 74 in the center of the latch, the latch 72 is also forced to the rear. By reason of this shifting the end 75 of the latch is now unbalanced and drops, falling into a pocket 76 formed in the base 6, and at the same time the flange 70 of the longitudinally movable member 9 is engaged (Fig. 17) by notch 77 formed in the upper surface of the latch at its forward end. Further rearward movement of the movable members is arrested by contact of the end 75 of the latch 72 with the wall 78 of the pocket 76. As the front wheel rolls rearwardly from the roller 28, the movable members move forwardly a short distance, carrying the latch with them by reason of the notch 77. The forward motion is arrested (Fig. 19) by contact of the forward end of the latch with the wall 79 of a pocket 80 formed in the base 6 in alignment with the latch. In moving forwardly, the relation of the latch 72 with reference to its supporting rod 73 is changed, and the forward end of the latch becomes the heavier end, but, however, does not fall at this time, due to friction of its contact with the wall 79 and flange 70. To release the movable members so that they can be moved forwardly to be locked by the bolt 30, it is only necessary to manually move the members slightly rearwardly, releasing the forward end of the latch which drops to the pocket 80 as shown in Fig. 16.

By the use of the wheel supports described, various tests to determine steering alignment, tread, pivot radius, wheel base, toe-in, camber, caster and king-pin tilt are facilitated.

In order to determine camber, caster and king-pin tilt a separate instrument is employed in conjunction with the wheel support, a form of instrument of this character having been made the subject matter of a pending application Serial No. 650,436, filed by me Jan. 6, 1933.

There has already been explained the manner of determining the tread, pivot radius, and the wheel base. In order to determine the steering alignment, the steering wheels are turned to simulate a right or left turn of some given angle. For example, in Fig. 10 the left front wheel is assumed to have been turned to an angle of 30° noted in the diagram shown in Fig. 12 as the angle 44. By reason of the steering arm and tie rod connection the right front wheel 4 will have arrived at some angle setting less than the stated angle of 30° the angle to which the right wheel has turned being read directly from the scale 42 of the right hand unit 1. This reading is the actual angle to which the right front wheel has turned but it does not follow, however, that this angle is the correct angle for this wheel when compared with the given angle of 30° to which the left wheel was turned. By a series of well known calculations involving the tread and wheel base dimensions, the correct angle may be determined, and again referring to Fig. 12 if the angle 45 through which the right front wheel is turned is not correct, suitable well known adjustments may be made whereby the faulty setting is remedied. In a similar manner, the steering gear may be further checked by simulating a right turn and the same procedure followed. In order to facilitate the mathematical calculations in finding the correct angle of deviation for a steering wheel in making turns, I prefer to make use of a steering gear geometry calculating device indicated at C in Fig. 2, this device being more fully described and illustrated in Letters Patent No. 2,028,622, January 21st, 1936.

The toe-in or gather of the steering wheels may readily be determined by the devices described by placing the front wheels on the supports in straight driving alignment, rotating the wheels thereon by power rollers, and noting by reference to the indicator fingers 43 the deviation of the zero point on the protractor scale 42 on each unit. It will be understood that rotation of the wheels causes relative rotation of the supports. Any misalignment of the wheels may then be readily detected. This toe-in reading must be taken into consideration in making certain tests in which the steering wheels are set at a given desired angle, such as in making a steering alignment test.

By the use of this apparatus in making tests of the character referred to, the tests are made in a more accurate manner because of the fact that the steering wheels may be either rotated upon their own axes or moved at certain desired angle as in steering with the weight of the car upon them so as to obviate any inaccuracy due to looseness owing to poor adjustment of bearings which may exist if the steering wheels are jacked up and relieved of the weight of the car. In other words, the steering wheels and steering connections may be tested and adjusted under actual running conditions and not under abnormal conditions.

Having thus described my invention, I claim:

1. In a testing apparatus for vehicle wheels, a stationary base, a support for a steering wheel longitudinally movable thereon with relation to the direction of travel of the vehicle, a runway leading to said support, a latch carried by the base and operable by a movement of the support in a rearward direction to lock the support against longitudinal movement in a forward direction, said latch having an elongated slot between its ends, a pivot pin extending through said slot, a shoulder engageable with a part of the said longitudinally movable support to shift and unbalance the latch to cause it to swing by gravity to engaging position with said longitudinally movable support, said latch having a notch to engage a part of said support to lock the same.

2. In a testing instrument for vehicle wheels, a support for the vehicle steering wheel consisting of a stationary base, an element on said base longitudinally movable in the direction of travel of the vehicle, an intermediate element freely movable laterally on said longitudinally movable element, and a horizontally disposed rotatable element carried by said intermediate element.

3. In a testing instrument for vehicle wheels, a base, an element mounted on said base longitudinally movable in the direction of travel of the vehicle, an element freely movable laterally carried thereby, a horizontally disposed rotary element carried by said laterally movable element, a support for a steering wheel on said rotatable element including means to rotate the wheel on its axis.

4. In a testing instrument for vehicle wheels, a base, a support for a steering wheel mounted on said base comprising an element longitudinally movable with respect to the direction of rotation of the vehicle, an element laterally movable with respect to said first element, and an element rotatable in a horizontal plane, and means for locking all of said elements against movement.

5. In a testing instrument for vehicle wheels, a base, a support for a vehicle steering wheel mounted on said base comprising an element longitudinally movable with respect to the direction of travel of the vehicle, an element laterally movable with respect to the first element, and an element rotatable in a horizontal plane, and means for locking all of said elements against movement when the steering wheel is being placed thereon, said locking means being operable to release the rotatable and laterally movable elements but maintain the longitudinally movable element locked.

6. In a testing instrument for vehicle wheels, a stationary base, an element thereon longitudinally movable with respect to the direction of travel of the vehicle, an element carried by the longitudinally movable element laterally movable with respect to the vehicle, an element rotatable in a horizontal plane carried by the laterally movable element, said elements having recesses adapted to be aligned, and a locking pin adapted to be positioned in said recesses to lock all of said elements together.

7. In a testing instrument for vehicles, a support for each of a pair of steering wheels, each support comprising a member longitudinally movable with respect to the direction of travel of the vehicle, a member mounted thereon laterally movable with respect to the direction of travel of the vehicle, and a horizontally disposed rotatable member mounted on said laterally movable member, a scale on said rotatable member having a zero point and indicia on either side of said zero point to indicate the extent of rotation thereof, and a pointer on the laterally movable member cooperating with said scale.

8. A gauge for the purpose indicated comprising a supporting base, a wheel-supporting table operatively connected thereto and mounted thereon for motion in any horizontal direction and for rotation, means for indicating amount of rotational movement of said table and manually actuable means for temporarily preventing a relative motion of translation between the base and table but which, upon being released, does not longer interfere with such motion.

9. A device for use in wheel gauging operations comprising a turntable, a member, pivot means directly interconnecting said turntable and said member for rotation of the turntable relative thereto, a base, means guiding said member and its interconnected turntable for universal bodily movement relative to the base, and quickly removable means interengageable between the turntable and said base to fix the turntable against all movement.

10. In a testing instrument for vehicle wheels, a stationary base, an element thereon longitudinally movable with respect to the direction of travel of the vehicle, an element carried by the longitudinally movable element laterally movable with respect to the vehicle, an element rotatable in a horizontal plane carried by the laterally movable element, said stationary base and rotatable element having recesses adapted to be aligned, and a locking pin adapted to be positioned in said recesses to lock all of said elements against movement.

CLYDE H. PHELPS.